Nov. 19, 1963
R. W. BEAN
3,111,477
FUEL ELEMENT
Filed Nov. 15, 1961
2 Sheets-Sheet 1
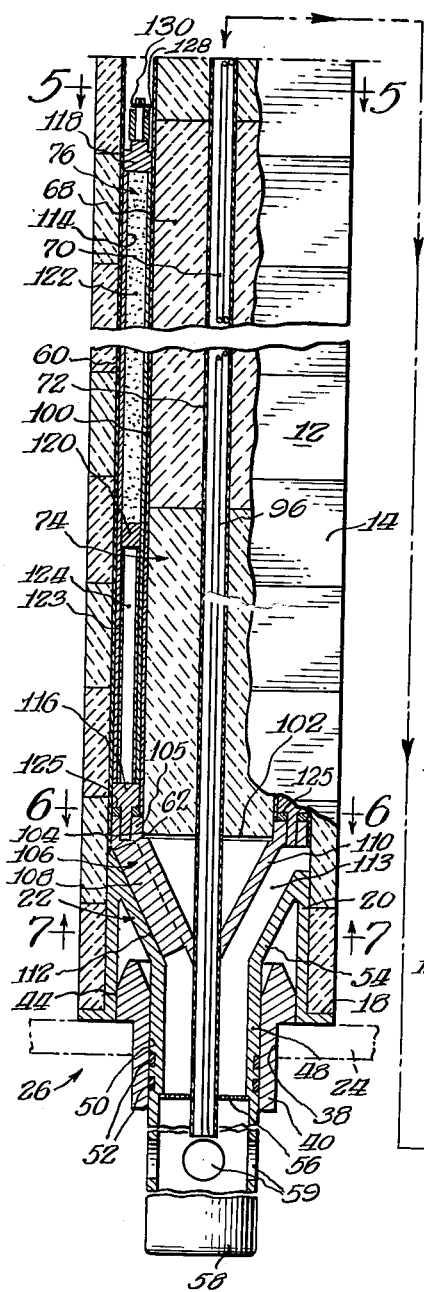
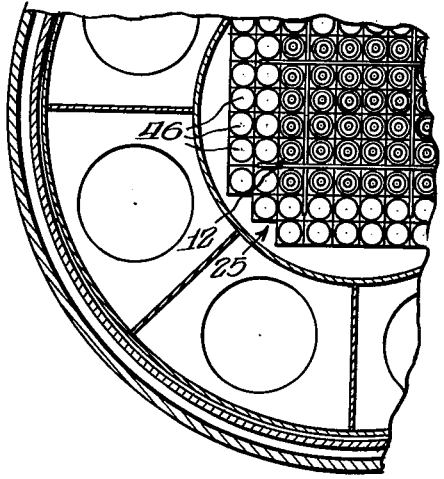
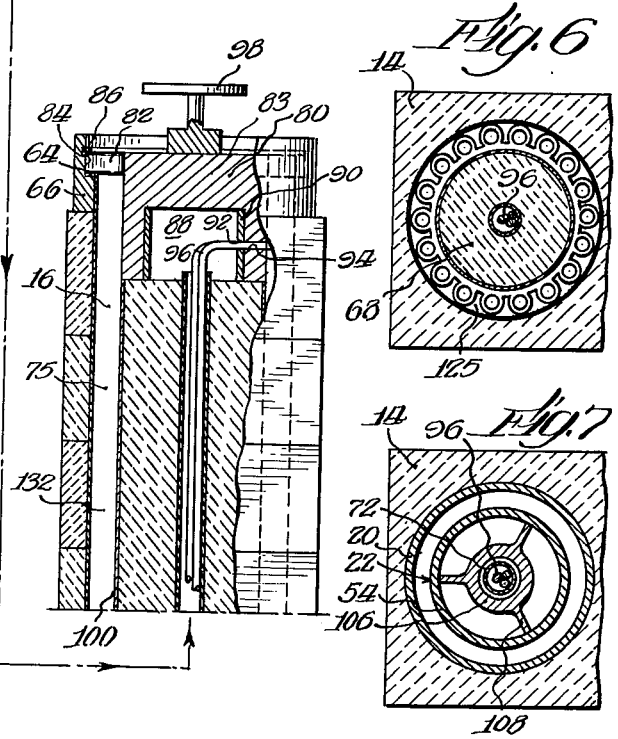
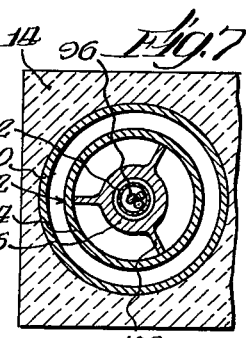
Inventor
Raymond W. Bean
By Roland A. Anderson
Atty Nov. 19, 1963    R. W. BEAN    3,111,477
FUEL ELEMENT
Filed Nov. 15, 1961    2 Sheets-Sheet 2
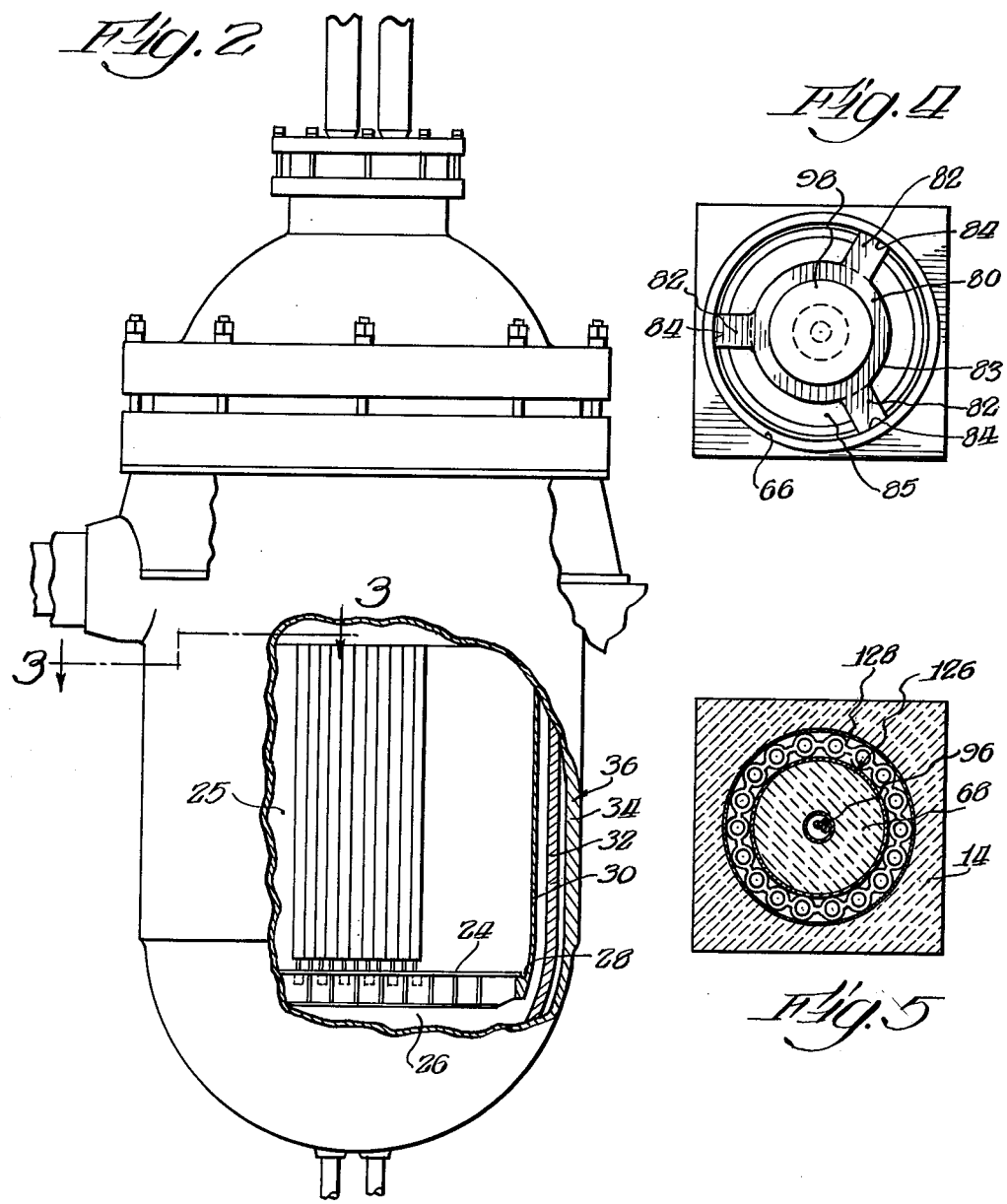
Inventor
Raymond W. Bean
By Roland A. Anderson
Atty

United States Patent Office 3,111,477
Patented Nov. 19, 1963

3,111,477
FUEL ELEMENT
Raymond W. Bean, San Diego, Calif., assignor, by mesne assignments, to the United States of America as represented by the United States Atomic Energy Commission
Filed Nov. 15, 1961, Ser. No. 152,694
10 Claims. (Cl. 204—193.2)

The present invention generally relates to nuclear reactors and more particularly relates to improved fuel elements for gas cooled nuclear reactors.

Gas cooled nuclear reactors generally offer various advantages over liquid cooled types. In this regard, gas cooled reactors usually can be operated, depending upon the nature of the individual fuel core components, at relatively higher temperatures so that increased efficiency of power generation can be provided.

In the construction of commercial gas-cooled nuclear reactors for use in electric power plants and the like, it is particularly desirable that the fuel elements be easily assembled from components which themselves can be easily and economically fabricated. The fuel elements should be readily accessible for removal and replacement to reduce the down-time of the reactor. They must also, of course, remain structurally sound over an extended period of time at high temperature. It would be of particular advantage to provide fuel elements of identical size and shape, so as to be capable of being readily repositioned within the reactor core after partial depletion in order to establish or reestablish a nearly uniform neutron flux distribution in the core, thereby extending the economical operation of the reactor.

The fuel elements of the present invention provide the indicated needs and advantages. They are suitable for use in gas cooled reactors at elevated temperatures and are simple to assemble from a plurality of easily fabricated small components. Moreover, since the fuel elements can be made substantially identical in size and shape and are designed so as to be readily accessible in the reactor core, they can be easily removed, replaced and repositioned in the core. Furthermore, the fuel elements of the present invention are designed to provide improved structural stability, uniformity of cooling and fission product retention in operation in the reactor. The peak temperature reached by the fuel elements during a loss-of-coolant accident is relatively low, so that danger of impairment of components of the fuel elements during such an accident is minimized.

Accordingly, the principal object of the present invention is to provide improved fuel elements for a nuclear reactor. It is also an object of the present invention to provide a structurally stable, readily removable and repositionable high temperature fuel element for a nuclear reactor of the gas cooled type. A further object of the present invention is to provide a solid fuel element which can be easily constructed, assembled and disassembled. It is also an object of the present invention to provide a solid nuclear fuel element for a gas cooled reactor which fuel element has a relatively low peak temperature during a loss-of-coolant accident and which provides improved means for assuring temperature uniformity throughout the fuel element.

Further objects and advantages of the present invention will be apparent from a study of the following detailed description and of the accompanying drawings of which:

FIGURE 1 is a side elevation of a preferred embodiment of the improved gas cooled solid nuclear reactor fuel element of the present invention, portions of the fuel element being broken away to illustrate the internal construction thereof;

FIGURE 2 is a schematic side elevation of a portion of a nuclear reactor employing the fuel element of FIGURE 1, portions being broken away to illustrate the internal construction thereof;

FIGURE 3 is a partial section taken along the section line 3—3 of FIGURE 2, illustrating a typical configuration of the reactor core of FIGURE 2;

FIGURE 4 is a top plan view of the fuel element of FIGURE 1;

FIGURE 5 is a horizontal section taken along the section line 5—5 of FIGURE 1;

FIGURE 6 is a horizontal section taken along the section line 6—6 of FIGURE 1; and, FIGURE 7 is a horizontal section taken along the section line 7—7 of FIGURE 1.

The present invention generally comprises an improved solid fuel element for a gas cooled high temperature nuclear reactor, which fuel element is constructed, in part, of a plurality of small sized moderator components easily fabricated and easily assembled and disassembled.

More particularly, the fuel element is largely constructed of ceramic material for structural stability and ease of fabrication. The fuel element comprises a plurality of blocks of a high temperature ceramic refractory moderator, preferably beryllia, assembled in a manner which provides positive location for a plurality of nuclear fuel-containing rods disposed within the fuel element. The rods are arranged in spaced relation in the form of a ring within an annular space between the blocks and a central spine of ceramic moderator, preferably beryllia. Provision is also made for positive channeling of gaseous coolant, such as helium, upwardly throughout the fuel element and around the fuel rods to assure uniform cooling thereof and minimal thermal stress thereto. Further provision is made for the location and interconnection of various metering devices within the fuel element. Each such fuel element is readily positionable at any location within the reactor core containing a plurality of such elements.

Now referring more particularly to FIGURE 1 of the accompanying drawings, a preferred embodiment of the improved fuel element 12 of the present invention, particularly adapted for use in a high temperature gas coolant nuclear reactor, such as that schematically illustrated in FIGURE 2, is illustrated in side elevation. The fuel element 12 is formed from a plurality of square moderator blocks 14 which are assembled in vertically stacked relation. Each of the blocks has a centrally located cavity 16 therein, as shown in FIGURE 1.

The moderator blocks may be fabricated of any suitable moderator which is a high temperature refractory material, such as graphite, alumina, zirconia, etc. Preferably, the moderator blocks 14 are fabricated from beryllia. Beryllia has been found to be structurally stable even at elevated temperatures. A particular advantage of the fuel element is that the plurality of beryllia blocks 14 are all relatively small and of identical size and shape so that no difficulties are encountered in fabricating or in assembling the same.

The blocks 14 are vertically stacked on a horizontally extending support flange 18 which has a square configuration conforming to the outer dimensions of the blocks. The flange 18 comprises the lower end portion of an outer sleeve 20 of a contoured member 22 shaped as shown in FIGURE 1. The contoured member may be fabricated of any suitable material such as stainless steel or the like high temperature metal or alloy, for example, Inconel (U.S. registered trademark of International Nickel Company) or Hastelloy (U.S. registered trademark of Haynes Stellite Company).

The contoured member is connected to the lower end of the fuel element 12 and serves as a support means for vertically positioning the fuel element 12 on a grid plate 24 in the reactor core 25 above the nuclear reactor lower plenum chamber 26, partially illustrated in FIGURE 1, and shown more particularly in FIGURE 2. As shown in FIGURE 2, the grid plate 24 is retained along the periphery thereof in a recess 28 of a support shell 30 surrounding the reactor core. The support shell 30 is, in turn, spaced inwardly from a surrounding thermal shield 32 which defines the walls of the lower planum chamber 26. The thermal shield 32, in turn is spaced inwardly from an outer shell 34 of the reactor vessel 36.

The grid plate 24 is provided with a plurality of holes 38 through each of which a plenum chamber nozzle 40 upwardly extends from the lower plenum chamber. The grid plate 24, thermal shield 32, outer shell 34 and plenum chamber nozzle 40 can be fabricated of any suitable high temperature material such as sainless steel or the like.

The inner surface of the outer sleeve 20 is demensioned to abut a portion of the outer surface 44 of the associated plenum chamber nozzle 40 extending above the grid plate 24, as shown in FIGURE 1, thus locating the fuel element 12 in the horizontal plane in the reactor core 25.

A centrally disposed reduced diameter sleeve portion 48 of the contoured member 22 is dimensioned to provide a close clearance with the inner surface 50 of the upper end of the plenum chamber nozzle 40, as shown in FIGURE 1. The reduced diameter sleeve portion 48 extends down through the grid plate and into the lower plenum chamber. It is provided with a plurality of peripheral seal rings 52, preferably two, to facilitate a tight fit with the plenum chamber nozzle.

A plurality of fuel elements thus positioned in the reactor core 25, are illustrated in FIGURE 3, with a plurality of reflector elements 46 containing moderator material, preferably beryllia, disposed around the periphery of the plurality of fuel elements 12 in the core.

The reduced diameter sleeve portion 48 is connected to the outer sleeve 20 at the upper end thereof by a conically shaped portion 54 of the contoured member. The reduced diameter sleeve portion 48 houses a strainer 56, fabricated of stainless steel mesh or the like to filter incoming coolant gas, and an instrumentation connector 58 disposed below the strainer, as shown in FIGURE 1. Also provided below the strainer 56 and in the wall of the reduced diameter sleeve portion 48 is a plurality of coolant inlet ports 59, preferably four.

A thin walled tubular shroud 60 fabricated of stainless steel or other suitable metal such as Inconel or Hastelloy is positioned with the periphery thereof abutting the inner surface of the blocks 14 and defines the central cavity 16. The bottom end 62 of the shroud is attached to the contoured member, as illustrated in FIGURE 1, particularly adjacent the upper end of the junction between the conical portion 54 and the outer sleeve 20 of the contoured member 22. The upper end of the shroud is flared into a recess 64 in a fuel element cap 66, which rests on the uppermost of the plurality of moderator blocks. The cap 66 has a square periphery to match that of the blocks 14, and has a circular central cavity to also match that of the blocks 14, as shown in FIGURE 4 of the accompanying drawings. The cap 66 may be fabricated of any suitable material, such as stainless steel or the like.

A plurality of moderator cylinders 68, preferably fabricated of beryllia or other high temperature refractory material, such as zirconia, graphite or the like, and having a central hole 70 therein, are centrally disposed in vertically stacked relation in the cavity 16 of the fuel element on a hollow thin walled tube 72 fabricated of stainless steel or the like. The tube 72 provides a passageway for instrumentation leads from the connector 58. The plurality of cylinders 68 form the hollow central spine 74 of the fuel element 12, as illustrated in FIGURE 1. The spine 74 is dimensioned so as to be spaced inwardly from the shroud 60 and forms therewith an annular space 75 within which are disposed a plurality of spaced fuel-containing rods 76, more particularly described hereinafter.

A spine cap 80 is disposed on the upper end of the spine, as shown in FIGURE 1, and is fabricated of metal, such as stainless steel or the like. The spine cap 80 is dimensioned to fit the spine, as shown in FIGURE 4, and has three peripherally extending fingers 82 which rest in a recess 84 of cap 66, as shown in FIGURE 1. Spaces 85 bounded by the body 83 of the cap 80, the fingers 82, and the inner surface of 66 are provided through which coolant gas passing upwardly from the annular space 75 can exit the fuel element. The cap 80 is held in place by a peripheral snap ring 86. The body 83 of the spine cap 80 is provided with a central hollow chamber 88 extending from the lower end thereof up part way in the cap 80, in which chamber a loosely fitting sleeve 90 is disposed. Sleeve 90 has several slots 92 therein which mate with corresponding slots 94 in the spine cap and which form a passageway for instrumentation wires, tubes 96, etc., passing to the annular space 75, as shown in FIGURE 1. A knob 98 is centrally disposed on and affixed to the top surface of the spine cap, which knob serves as a lifting lug for the fuel element 12.

The stack of central moderator cylinders 68 forming the spine 74 is maintained in radial alignment by a thin metal tube 100, fabricated of stainless steel or the like, which tube extends down from the spine cap 80 over the outer surface of the moderator cylinders 68, terminating approximately in the plane of the upper fuel pin holder 126 comprising a spacer ring 128, disclosed hereinafter. Radial alignment to the remainder of the central moderator cylinder is provided by the fuel rods 76. Moreover, the spine 74 is supported on a horizontally extending plate 102, fabricated of stainless steel or the like, to which the central tube 72 is rigidly connected. The plate 102, in turn, is supported at the periphery thereof in a recess 104 provided in a vertically extending upper rim 105 of an inverted cone-shaped lower fuel rod holder 106 fabricated of stainless steel or the like, metal or alloy.

The fuel rod holder 106 has a plurality of downwardly and outwardly extending ribs 108 along the outer surface 110 thereof, which ribs rest on the adjoining inner surface 112 of the conical portion 54 of the contoured member 22, as illustrated in FIGURE 1, thus, providing support for the spine 74 and horizontal plate 102. The ribs 108, together with the outer surface 110 of the fuel rod holder 106 and the adjoining inner surface 112 of the conical portion 54 of the contoured member 22, define a plurality of coolant gas passageways 113 which direct coolant gas flow upwardly from the lower plenum chamber into the annular space 16 containing the fuel rods 76.

There are 18 fuel rods in the preferred embodiment illustrated in FIGURE 1, although a larger or smaller number of fuel rods could be utilized, depending upon the particular reactor requirements. Each fuel rod 76 comprises an elongated, cylidrical thin walled hollow tube 114, fabricated of Hastelloy, Inconel or other stainless steel or the like high temperature metal or alloy, for example, about 20 mils thick. Each tube 114 is provided with a bottom end cap 116 and a top end cap 118, as illustarted in FIGURE 1, and also fabricated of metal, such as that utilized for the tube 114. A ceramic plug 120 fabricated of beryllia or the like relatively porous to gaseous fission products is disposed within the tube 114 below an upper fuel-containing portion 122. The porous plug 120 separates the fuel from a lower fission gas expansion chamber 124, within the tube 114. The sidewall of the chamber 124 can extend down to the bottom end cap 116 and can be provided with a sleeve 123 fabricated of ceramic, such as beryllia, or a metal, such as stainless steel.

The nuclear fuel disposed in upper portion 122 comprises any suitable ceramic nuclear material, for example, enriched or unenriched thoria, urania, etc. For example, thorium 232 or uranium 238 in the oxide form and enriched with uranium 235, also in the oxide form, can be used. The nuclear fuel is intimately mixed with ceramic moderator material, such as beryllia, alumina, etc., preferably beryllia. The fuel-moderator mixture may be present in the form a plurality of small spheroids preferably containing beryllia or other ceramic coating, or may be a single large compact, with or without a ceramic coating disposed over the outer surfaces thereof, prepared according to any suitable fabrication procedure, i.e., pressing, sintering, etc. Other suitable forms for the mixture of fuel and ceramic moderator are contemplated. A particularly suitable fabrication procedure for such mixtures is set forth in copending U.S. application, Serial No. 59,485, filed September 30, 1960, of which Dale E. Johnson and Fred H. Lofftus are the inventors. It will be understood that other procedures are also available for combining the necessary constituents to form the fuel rods. One procedure calls for the addition of calcium nitrate or magnesium nitrate to uranium dioxide-beryllia powdered mixtures as a sintering aid. The nitrate is used in a concentration to provide, after sintering, about 1 weight-percent of calcia or magnesia. The resultant mixtures can then be suitably shaped and compacted and then sintered at, for example, about 1650° C. in a mixture of hydrogen and nitrogen to provide finished fuel in pellet form, in cylindrical form, or in other suitable shapes. The finished nuclear fuel-moderator mixture, termed for the purposes of the present invention a fuel rod, is held in vertically disposed relation in the cavity or space 16. In this regard, the bottom end cap 116 of each fuel rod is secured, as by welding, in a lower spacer ring 125 in the rim of the bottom fuel rod holder 106. The spacer ring 125 is illustrated in FIGURE 6 and, as indicated, is adapted to secure the lower end cap of the 18 fuel rods in annular spaced relation. The upper end caps 118 of the 18 fuel rods are held in annular spaced relation from one another in an upper fuel rod holder 126, as shown in FIGURES 1 and 5. The holder 126 comprise a spacer ring 128, shown in FIGURE 5, similar to spacer ring 125. Preferably, as shown in FIGURE 1, a plurality, such as six, of the eighteen fuel rods have top end caps 118 which extend above the spacer ring 128, and which are provided with horizontally extending locking pins 130 to prevent displacement of the upper fuel pin holder 126.

Various advantages are provided by the described arrangement of the fuel rods 76 within the fuel element 12. Thus, it is relatively easy to position the fuel rods in the annular cavity, particularly since each rod is separated radially by continuous structure on both sides, i.e., the shroud 60 and the spine 74. Moreover, the flow of coolant gas around the described fuel rod assembly is more uniform than is possible, for example, if the fuel rods were positioned in a centrally located cluster. The coolant enters the fuel element 12 from the lower plenum chamber through the space within the narrow diameter sleeve, passes up around the lower fuel rod hoider and fuel rods, then around the upper fuel rod holder and into the area 132 above the fuel rods, finally exiting the fuel element through the space between cap 66 and cap 80, as previously described. The upward flow of coolant around each of the fuel rods asures that fuel rod temperatures at particular power levels can be accurately determined and that the structural performance of the fuel element can be predicted with a high level of confidence. Moreover, the thermal stress at various points along the length of the fuel element is minimized. Accordingly, a structurally sound, efficient fuel rod assembly can be provided in accordance with the present invention by the indicated spacing of the fuel rods in an annular array. Since coolant gas within the fuel element 12 flows at a higher pressure than that found exterior to the moderator blocks 14, this differential has the beneficial effect of aiding in maintaining the shape of the shroud 60 to prevent inward buckling thereof. The shroud serves to prevent cross-flow of the coolant gas between the blocks.

From the foregoing, it will be readily understood that the components of the described fuel element can be readily fabricated and can be easily assembled to provide the finished fuel element. Thus, the lower fuel rod holder can be installed on the contoured member. The central tube 72 and horizontal plate can be attached and the moderator cylinders 68 can be stacked to form the spine 74. Instrumentation leads can be passed through the tube 72 and positioned at the upper end after placing the cap 80 and associated sleeve on the top of the spin. After the metal tube is positioned on the periphery of the cylinders 68, the fuel rods can be inserted in the lower pin holder and upper pin holder and the rods can be pinned in place. The outer moderator blocks can be vertically stacked on the horizontal flange of the contoured member. The cap 66 and associated snap ring can be positioned on the uppermost of the stack of blocks 14. The assembled fuel element with the strainer and instrumentation connector in place can be positioned with respect to a given lower plenum chamber nozzle, as previously described.

When it is desired to reposition the fuel element in a nuclear reactor core, the fuel element can be readily withdrawn from contact with the associated plenum chamber nozzle, and, since each fuel element is of identical size, it can be readily repositioned in the reactor core. Disassembly of the fuel element can take place as readily as assembly, with removal of the components step by step for withdrawal and replacement of the fuel rods, etc.

The parameters for a typical fuel element constructed in accordance with the present invention and for a typical nuclear reactor employing a plurality of such fuel elements are set forth in the following table:

TABLE

Power rating_____ 10 mwt.
Neutron flux:
    Fast_____ $3.1 \times 10^{13} > (0.2$ mev.$)$.[1]
    Thermal_____ $4.8 \times 10^{12} < (0.68$ mev.$)$.[1]
Power peaking factors:
    Axial_____ 2.2.
    Radial_____ 1.15.
Excess reactivity to compensate for—
    Temperature changes_____ 4%.
    Xe and Sm at rated power_____ 2%.
    Burnup_____ 3%.
    Maximum excess with dry core_____ 9%.
    Maximum excess flooded_____ 21%.
Fuel:
    22 vol. percent $UO_2$ in BeO
    70% enriched uranium
    Pellet diameter, 0.33 inch
    Pellet length, 0.43 inch
    178 pellets per fuel pin
Cladding:
    0.020 inch Hastelloy tubing
    0.335 inch I.D. x 80 inch long
Core dimension: 2329 inch square x 76 inch long
Reflector: 7 inches of BeO
Number of fuel elements: 36
Lattice: Square lattice with 3.64 inch pitch
Critical mass—cold unpoisoned: 43 kg. $U^{235}$
Core loading: 100 kg. $U^{235}$
Average power density in core:
    14.4 kw./liter=$1.40 \times 10^6$ B.t.u./hr.-ft.$^3$
Total BeO in core: 2,389 lbs
Total BeO in reflector: 5,741 lbs.
Heat transfer data: Heat flux at fuel element surface—
    Average, 5.8 cal./cm.$^2$ sec.=77,100 B.t.u./ft.$^2$-hr.
    Maximum, 15.0 cal./cm.$^2$ sec.=200,000 B.t.u./ft.$^2$-hr.

[1] Neutrons per square cm. per sec.

Fuel element temperatures:
  Maximum fuel _____ 910° C.=1670° F.
  Maximum cladding _____ 730° C.=1350° F.
Coolant flow area:
  Per fuel element _____ 7.5 cm.²=1.165 in.²
  Total _____ 270 cm.²=41.94 in.²
Channel velocity of coolant:
  Minimum, 50 m./sec.=166 ft./sec.
  Maximum, 75 m./sec.=246 ft./sec.
Heat transfer coefficient:
  0.134 cal./sec.-cm.² ° C.=989 B.t.u./ft.²-hr.-° F.
Coolant mass flow rate: 6.3 kg./sec.=13.88 lb./sec.
Coolant temperature:
  Inlet _____ 400° C.=750° F.
  Outlet _____ 700° C.=1300° F.
Hot channel factors:[2]
  Temperature rise of coolant _____ 1.152
  Temperature drop of film _____ 1.20
  Over-all temperature drop for cladding and fuel _____ 1.594

*Control*

Shim-safety rods (also used as regulating rods):
  Four cruciform: active length 76″
  Worth of shim-safety rods: 39% δ k.
  Shim-safety rod speed:
    0.15 cm./sec. insertion or withdrawal
    0.30 cm./sec. insertion only
Maximum rate of reactivity addition: $1.5 \times 10^{-4}$ k./k./sec.
Scram time and type of mechanism:
  0.7 sec. for 50% insertion; 2.0 sec. for full insertion
  High speed pneumatic motor-driven lead screw, positive scram blade insertion
Temperature coefficient:
  Cold:
    Prompt −0.54
    Delayed +0.14
    $\overline{-0.40} \times 10^{-4}$ δ k./k./° C.

Hot:
    Prompt −0.25
    Delayed −0.02
    $\overline{-0.27} \times 10^{-4}$ δ k./k./° C.

Hot equil. poison:
    Prompt −0.25
    Delayed +0.10
    $\overline{-0.15} \times 10^{-4}$ δ k./k./° C.

*Reactor Vessel*

Form, material and dimensions:
  Cylindrical shell with the hemispherical heads
  Shell wall thickness is 5+¼″
Working and test pressure: P.s.i.a.
  Working pressure _____ 1120
  Design pressure _____ 1250
  Test pressure _____ 1875
Reactor overall dimensions with shielding:
  Overall height of reactor including control rod drives: 34′
  Outside diameter of pressure vessel over primary flange: 13′
Containment type and materials:
  No containment vessel. Reactor is located in a vault with concrete walls and bottom and covered with removable concrete slabs.

[2] For lowest powered channel which gives the maximum cladding temperature.

Accordingly, an improved ceramic fuel element is described which includes a novel arrangement of components to provide improved results. The fuel element is constructed largely of ceramic material, including the fuel, with high temperature metal components where suitable. It has high structural stability, durability and utility, and provides simplified construction with improved performance. Various other advantages are set forth in the foregoing.

Various of the features of the present invention are set forth in the appended claims.

What is claimed is:

1. A ceramic fuel element for a nuclear reactor, which fuel element comprises a plurality of stacked hollow ceramic moderator blocks, the inner surfaces of which define an annular cavity, a cap disposed on the upper end of said stack of blocks, a metallic shroud sheathing said inner surfaces, a hollow spine comprising a plurality of stacked ceramic moderator cylinders having a central hole therein and centrally disposed within said stack of blocks and spaced inwardly from said inner surfaces thereof, whereby an annular space is defined by the said cylinders and said shroud, a spine cap disposed on the upper end of said spine and interconnected to said block cap to provide a space communicating with said annular space, support means retaining said spine in position in said fuel element, a plurality of ceramic nuclear fuel rods spaced apart within said annular space, means adapted to channel coolant gas into contact with said rods, and means adjacent the bottom of said fuel element and adapted to support said fuel element in a vertical position within a nuclear reactor core.

2. A ceramic fuel element for a nuclear reactor, which fuel element comprises a plurality of stacked hollow ceramic moderator blocks, the inner surfaces of which define an annular cavity, a cap disposed on the upper end of said stack of blocks, a metallic shroud sheathing said inner surfaces, a hollow spine comprising a plurality of stacked ceramic moderator cylinders having a central hole therein and centrally disposed within said cavity and spaced inwardly from said inner surfaces of said blocks, whereby an annular space is defined by the said cylinders and said shroud, a spine cap disposed on the upper end of said spine and interconnected to said block cap to define a space communicating with said annular space, support means retaining said spine in position in said fuel element, said support means, including a hollow metallic tube disposed in said hole and metallic sheathing disposed on the outer surface of said cylinders, a plurality of ceramic nuclear fuel rods spaced apart and vertically aligned within said annular space, rod support means supporting said rods adjacent the upper and lower ends thereof within said space, means adapted to channel coolant gas into contact with said rods, and means adjacent the bottom of said fuel element and adapted to support said fuel element in a vertical position within a nuclear reactor core.

3. A ceramic fuel element for a nuclear reactor, which fuel element comprises a plurality of stacked hollow ceramic moderator blocks, the inner surfaces of which define an annular cavity, a spine comprising a plurality of stacked ceramic moderator cylinders centrally disposed within said cavity and spaced inwardly from the inner surfaces of said blocks, whereby an annular space is defined by the said cylinders and said blocks, support means retaining said spine in position in said fuel element, a plurality of ceramic nuclear fuel rods spaced apart within said annular space, each of said rods comprising a metallic tube, the upper portion thereof including nuclear fuel comprising at least one compact including a mixture of ceramic moderator and ceramic nuclear fuel, said tube also including a lower coolant gas expansion chamber separated from said fuel by a ceramic plug, means adapted to channel coolant gas into contact with said rods, and means adjacent the bottom of said fuel element and adapted to support said fuel element in a vertical position within a nuclear reactor core.

4. A ceramic fuel element for a nuclear reactor, which fuel element comprises a plurality of stacked hollow ceramic moderator blocks, the inner surfaces of which define an annular cavity, a spine comprising a plurality of stacked ceramic moderator cylinders centrally disposed within said stack of blocks and spaced inwardly from the inner surfaces thereof, whereby an annular space is defined by the said cylinders and said blocks, support means retaining said spine in position in said fuel element, a plurality of ceramic nuclear fuel rods spaced apart within said annular space, each of said rods comprising a metallic tube, the upper portion thereof including nuclear fuel comprising at least one compact including a mixture of ceramic moderator and nuclear fuel oxides, said tube also including a lower coolant gas expansion chamber separated from said fuel by a porous ceramic plug, said ceramic moderator comprising beryllia and said nuclear fuel oxide being at least one of thorium oxide and uranium oxide, means adapted to channel coolant gas into contact with said rods, and means adjacent the bottom of said fuel element and adapted to support said fuel element in a vertical position within a nuclear reactor core.

5. A ceramic fuel element for a nuclear reactor, which fuel element comprises a plurality of stacked hollow beryllia blocks, the inner surfaces of which define an annular cavity, a cap disposed on the upper end of said stack of blocks, a metallic shroud sheathing said inner surfaces, a hollow spine comprising a plurality of stacked beryllia cylinders having a central hole therein and centrally disposed within said stack of blocks and spaced inwardly from said inner surfaces thereof, whereby an annular space is defined by the said cylinders and said shroud, a spine cap disposed on the upper end of said spine and interconnected to said block cap, support means retaining said spine in position in said fuel element, a plurality of ceramic nuclear fuel rods spaced apart within said annular space, means adapted to channel coolant gas into contact with said rods, and means adjacent the bottom of said fuel element and adapted to support said blocks and said fuel element in a vertical position within a nuclear reactor core.

6. A ceramic fuel element for a nuclear reactor, which fuel element comprises a plurality of stacked hollow beryllia blocks, the inner surfaces of which define an annular cavity, a cap disposed on the upper end of said stack of blocks, a metallic shroud sheathing said inner surfaces, a hollow spine comprising a plurality of stacked beryllia cylinders having a central hole therein and centrally disposed within said stack of blocks and spaced inwardly from said inner surfaces thereof, whereby an annular space is defined by the said cylinders and said shroud, a spine cap disposed on the upper end of said spine and interconnected to said block cap, support means retaining said spine in position in said fuel element, said support means including a hollow metallic tube disposed in said hole and metallic sheathing disposed on the outer surface of said cylinders, a plurality of ceramic nuclear fuel rods spaced apart within said annular space, rod support means vertically supporting said rods adjacent the upper and lower ends thereof within said space, means adapted to channel coolant gas into contact with said rods, and means adjacent the bottom of said fuel element and adapted to support said blocks and said fuel element in a vertical position within a nuclear reactor core.

7. A ceramic fuel element for a nuclear reactor, which fuel element comprises a plurality of stacked hollow beryllia blocks, the inner surfaces of which define an annular cavity, a spine comprising a plurality of stacked beryllia cylinders centrally disposed within said stack of blocks and spaced inwardly from the inner surfaces thereof, whereby an annular space is defined by the said cylinders and said blocks, support means retaining said spine in position in said fuel element, a plurality of ceramic nuclear fuel rods spaced apart within said annular space, each of said rods comprising a metallic tube, the upper portion thereof including nuclear fuel comprising at least one compact including a mixture of beryllia and nuclear fuel oxides, said tube also including a lower coolant gas expansion chamber separated from said fuel by a porous ceramic plug, means adapted to channel coolant gas into contact with said rods, and means adjacent the bottom of said fuel element and adapted to support said fuel element in a vertical position within a nuclear reactor core.

8. A ceramic fuel element for a nuclear reactor, which fuel element comprises a plurality of stacked hollow beryllia blocks, the inner surfaces of which define an annular cavity, a spine comprising a plurality of stacked beryllia cylinders centrally disposed within said stack of blocks and spaced inwardly from the inner surfaces thereof, whereby an annular space is defined by the said cylinders and said blocks, support means retaining said spine in position in said fuel element, a plurality of ceramic nuclear fuel rods spaced apart within said annular space, each of said rods comprising a metallic tube, the upper portion thereof including nuclear fuel comprising at least one compact including a mixture of beryllia and nuclear fuel oxides, said tube also including a lower coolant gas expansion chamber separated from said fuel by a porous ceramic plug, said ceramic moderator comprising beryllia and said nuclear fuel oxide being at least one of thorium oxide and uranium oxide, means adapted to channel coolant gas into contact with said rods, and means adjacent the bottom of said fuel element and adapted to support said fuel element in a vertical position within a nuclear reactor core.

9. A ceramic fuel element for a nuclear reactor, which fuel element comprises a plurality of stacked hollow ceramic moderator blocks, the inner surfaces of which define an annular cavity, a cap disposed on the upper end of said stack of blocks, a metallic shroud sheathing said inner surfaces, a hollow spine comprising a plurality of stacked ceramic moderator cylinders having a central hole therein and centrally disposed within said stack of blocks and spaced inwardly from said inner surfaces thereof, whereby an annular space is defined by the said cylinders and said shroud, a spine cap disposed on the upper end of said spine and interconnected to said block cap to define a space communicating with said annular space, support means retaining said spine in position in said fuel element, said support means including a hollow metallic tube disposed in said hole and metallic sheathing disposed on the outer surface of said cylinders, a plurality of ceramic nuclear fuel rods spaced apart within said annular space, each of said rods comprising a metallic tube, the upper portion thereof including nuclear fuel comprising at least one compact including a mixture of ceramic moderator and nuclear fuel oxides, said tube also including a lower coolant gas expansion chamber separated from said fuel by a porous ceramic plug, rod support means supporting said rods adjacent the upper and lower ends thereof vertically within said space, means adapted to channel coolant gas into contact with said rods, and means adjacent the bottom of said fuel element and adapted to support said blocks and said fuel element in a vertical position within a nuclear reactor core.

10. A ceramic fuel element for a nuclear reactor, which fuel element comprises a plurality of stacked hollow beryllia blocks, the inner surfaces of which define an annular cavity, a block cap disposed on the upper end of said stack of blocks, a metallic shroud sheathing said inner surfaces, a hollow spine comprising a plurality of stacked beryllia cylinders having a central hole therein and centrally disposed within said stack of blocks and spaced inwardly from said inner surfaces thereof, whereby an annular space is defined by the said cylinders and said shroud, a spine cap disposed on the upper end of said spine and interconnected to said block cap, to define a space communicating with said annular space, support means retaining said spine in position in said fuel element, said support means including a hollow metallic tube disposed in said hole and metallic sheathing disposed on the outer surface of said cylinders, a plurality of ceramic nuclear fuel rods spaced apart within said annular space, each of said rods comprising a metallic tube, the upper portion thereof including nuclear fuel comprising at least one compact including a mixture of beryllia and nuclear fuel oxides, said tube also including a lower coolant gas expansion chamber separated from said fuel by a porous beryllia plug, rod support means including spacer rings vertically supporting said rods adjacent the upper and lower ends thereof within said space, means adapted to channel coolant gas into contact with said rods, and means adjacent the bottom of said fuel element and adapted to support said blocks and said fuel element in a vertical position within a nuclear reactor core.

References Cited in the file of this patent

UNITED STATES PATENTS

| | | |
|---|---|---|
| 2,864,758 | Shackelford | Dec. 16, 1958 |
| 3,039,947 | Fortescue et al. | June 19, 1962 |

FOREIGN PATENTS

| | | |
|---|---|---|
| 838,838 | Great Britain | June 22, 1960 |
| 841,545 | Great Britain | July 20, 1960 |
| 845,804 | Great Britain | Aug. 24, 1960 |
| 1,246,699 | France | Oct. 10, 1960 |
| 607,136 | Canada | Oct. 18, 1960 |
| 861,329 | Great Britain | Feb. 15, 1961 |

OTHER REFERENCES

Chemical and Engineering News, Feb. 25, 1957, page 98.